June 11, 1957 — A. L. COEN — 2,795,335
BASKET

Filed May 18, 1953 — 2 Sheets-Sheet 1

INVENTOR.
Aldo L. Coen
BY
Watson D. Harbaugh
Atty.

June 11, 1957          A. L. COEN          2,795,335
BASKET
Filed May 18, 1953          2 Sheets-Sheet 2
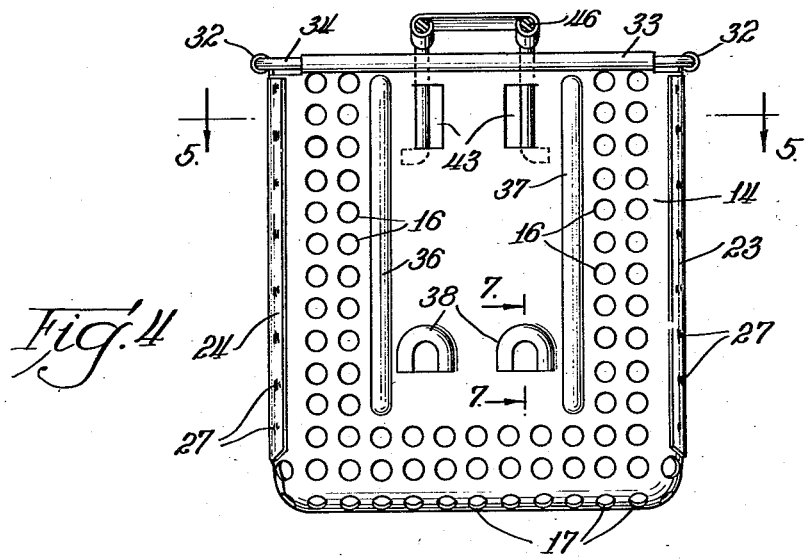
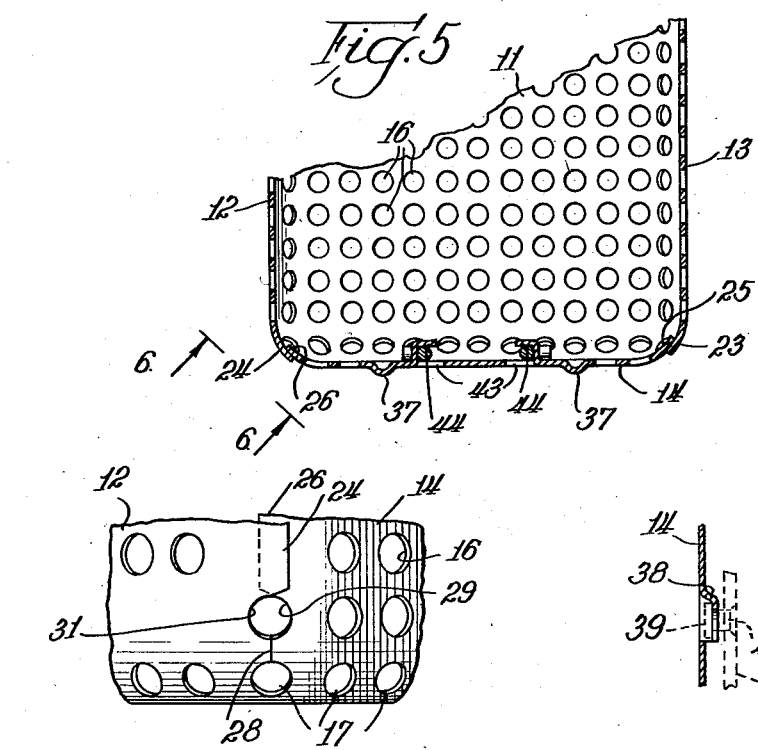
INVENTOR.
Aldo L. Coen

United States Patent Office 2,795,335
Patented June 11, 1957

2,795,335

BASKET

Aldo L. Coen, Chicago, Ill., assignor to Dormeyer Corporation, Chicago, Ill., a corporation of Illinois Application May 18, 1953, Serial No. 355,660

8 Claims. (Cl. 210—497)

The present invention relates to improvements in baskets or colander devices of a type which are designed to be utilized as accessories for deep fat frying utensils.

In order to obtain maximum performance and efficiency out of electrically heated deep fat frying appliances it is desirable to provide a light weight yet sufficiently rugged food receptacle for containing the victuals which are to be fried so that they may be immersed into the cooking well of the utensil under conditions which permit free circulation of the cooking oils respecting all surfaces of the basket contents. At the same time it is highly desirable to attach the basket to protrusion fixtures carried at an upper level within the heating appliance chamber so that the contents may be left to drain immediately above and within close range of the rising heat vapors.

For this purpose colander baskets have heretofore been constructed of woven wire or coarse screen mesh formed by die drawing or shaping into rectangular slightly tapering units which are received into the cooking space or well. The mouth or rim of such baskets were constructed around a perimetric wire of sturdy size with the skirting portions of the basket wires trained against it and secured as by welding or soldering. In order to render utensils of this class entirely safe against food contamination on account of possible chemical reaction between the metal parts and the food, such parts were required to be coated as by the use of tin. Since this coating application could be efficiently applied only after the basket had been completed rather than upon the wire filament from which it was made the coating metal was applied by a hot dipping process. One of the incidental characteristics of this protective coating method is that it causes a gathering of tin at the intersections of the wires in corner fillet due probably to an adherence characteristic such as capillarity or surface tension. With plating tin selling at from twenty-five to thirty times the price of the base metal these effects consume an inordinate excess of tin resulting in a substantially more costly end product attended by inferior appearance.

Also, shaping operations respecting wire baskets have been observed to produce irregular effects. In order to give requisite depth there has resulted an accumulation of more closely spaced wires in corner regions and in contrast therefrom a more wide-spread spacing in other regions. These problems are well recognized as prevalent in other examples of screen wire formed devices whether of flexible or rigid wire filaments. As a result of this unevenness the esthetic qualities of the resulting product is materially impaired, the contour or shape is limited, reinforcing wire frame constructions have to be added, and in addition the adherence of the coating metal in haphazard and clotting concentrations are factors which have combined to make the wire dipped basket a selling deterrent rather than an appealing attraction.

In order to overcome these undesirable characteristics it is herewith proposed to provide a colander or drain basket for deep-fat frying appliances made of a single sheet of perforated metal, profiled, formed with all reinforcement upsets in proper place and welded. Aluminum or other impervious metal may be used for this purpose which when fabricated into an esthetically pleasing accurately dimensioned container results in an accessory device that enhances the appliance. A detachable handle of the known class is secured to coupling fixtures which may be stamped and formed from the sheet body metal under a more highly efficient operating and manufacturing practice of die-stamping and cutting. In carrying out this invention under the aforedescribed practices a colander type of food retaining receptacle may be produced of exceedingly light weight, easy to clean, having abundant eye appeal, and possessed of adequate rigidity and versatility in shape and sizes to fulfill all of the requisites of this class of apparatus as indicated by established practices, and in addition thereto extending other practical and utilitarian advantages heretofore lacking in this class of articles.

Accordingly a principal object of the present invention is to provide a food-containing basket for deep well frying appliances which is economical to manufacture, which possesses abundant sturdiness so as to enable it to withstand carefree or even reckless handling to which it may sometimes be subjected and yet possess requirements regarding efficiency and production cost limitations which contribute towards making for successful marketability and which if inadvertently bent, can be bent back to shape without any coating metal loosening or peeling off.

Another object of the present invention is to provide a novel method of deep well basket construction in which a submersible and wall-mountable rectangular food receptacle shaped to the exact contour for operation in the well is made out of a single sheet of metallic stock, perforated, formed, reinforced and welded into a rigid, clean unit with linear evenness and symmetry in respects to contour pattern whereby to achieve higher levels of durability and eye appeal.

The foregoing and other objects of the present invention may be achieved by the practices of various methods and features of construction which will now be explained in more detail having reference to the accompanying drawings. In the following specification as well as in the annexed drawings similar reference numerals designate corresponding parts throughout.

Fig. 4 is an end elevational view of the article disclosed in Fig. 1.

Fig. 5 is a fragmentary sectional view taken approximately on line 5—5 of Fig. 4.

Fig. 6 is a fragmentary oblique view on an enlarged scale as indicated by the viewing line 6—6 on Fig. 5, and Fig. 7 is a fragmentary detail sectional view on an enlarged scale taken approximately on line 7—7 of Fig. 4.

Figure 1:
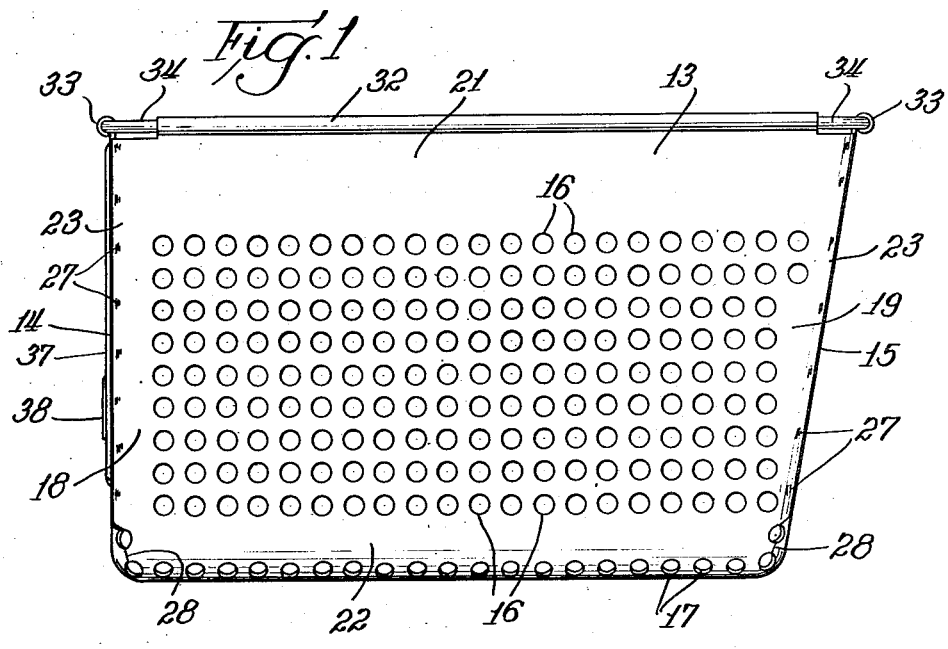
Fig. 1 is a side elevational view of a deep well fryer basket constructed in accordance with various features of the present invention.

The receptacle portion of the basket is made of a single aluminum sheet that may be die sheared of generally cruciform outline and comprises a central bottom wall panel 11, Fig. 5, similar side wall panels 12 and 13, a rear wall panel 14 generally perpendicular to the bottom wall panel 11, together with a sloping fore-wall panel 15. Where each one of the side panels joins with the bottom wall panel 11 it is curved along a predetermined radius as best shown in Figs. 1 and 4. For the purpose of making the interior of the basket throughout accessible to the free circulation of the frying oils of a deep well cooker all of the wall elements are abundantly perforated by carefully spaced perforations 16 and including a series or row of perforations 17, Figs. 1 and 6, disposed at the curvature radius aforedescribed.

In order to accommodate for a more secure binding together of the edges of the upstanding sides as will be later described, fringe areas of each panel are advantageously left imperforate as at 18 and 19, Fig. 1, and for the attainment of additional stiffness and rigidity corresponding areas may be left imperforate as at 21 and 22.

Side panels 12 and 13 are purposefully made sufficiently wide to afford opposed vertical edges with overlapping flanges 23 and 24, see Figs. 1, 4 and 6, while in correspondence therewith the end panels 14 and 15 are correspondingly constructed as at 25 and 26. From a point preferably just above the lowermost row of perforations 16 the two overlapping edges are soldered or welded as at 27, thereby integrating the unit and concurrently affording reinforcement at the corner positions so as to enable them to acquire added rigidity for the purpose of better withstanding buffeting.

At the part-spherical corner regions just beneath the flange portions 24 and 26 and again at 23 and 25, these vertical panels are designed to abut each other edge to edge as indicated at 28, Fig. 6, with flanking semicircular edge perforations as at 29 and 31, thereby permitting inflow access to the very corner extremities and for averting air pockets. In this way a sheet metal formed fryer basket may be made as thoroughly effective and as completely accessible to cooking oil penetration and thorough intermingling of heated volumes as has been heretofore obtainable by the use of wire mesh construction.

At their uppermost extremities the free edges of the panel components that constitute the vertical side walls are rolled over as at 32 and 33 to form an edge beading and within the opening of this beading at the corner intersections there is inserted a solid wire as at 34, giving to the upper lip of the finished basket an added rigidity as well as controlled planar alignment and a solid lip.

The rear vertical wall panel 14, Figs. 1 and 4, is die formed and cut with special reinforcing and utility provisions as will now be described. A pair of spaced vertically extending reinforcing ribs 36 and 37 is projected to flank a central area out of the lower end of which are struck out a pair of substantially arch-shaped brackets 38, see also Fig. 7, which are bent to dispose a major portion thereof in offset, substantially parallel relation to said one of said walls designed to receive the enlarged heads 39 which extend from a pair of correspondingly spaced horizontally protruding anchor pins 41 that jut from the internal surface of a rear wall 42 that defines a frying appliance well such as that revealed in the Braski et al. Patent No. 2,597,695, reference to which is hereby made. Because of the shortness in length of these jutting pins 41, together with their headed extremities 29, they are in this way enabled to be inserted through the openings of embossment 38 to retain the basket in a poised position so that the bottom wall 11 is held directly over the hot oil vapors so that the contents of the basket may be more effectively drained of absorbed cooking oils.

Figure 2:
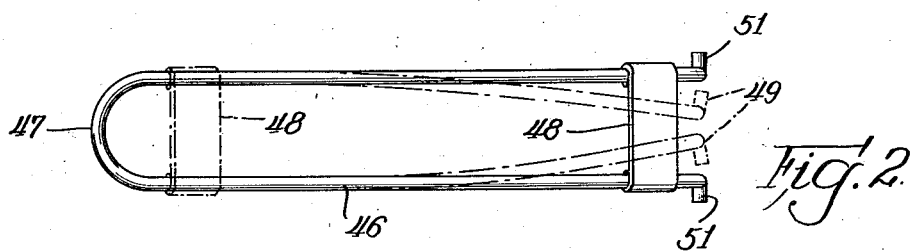
Fig. 2 is a detail plan view of a detachable wire handle for use with a basket constructed in accordance with the disclosure of Fig. 1.
Figure 3:
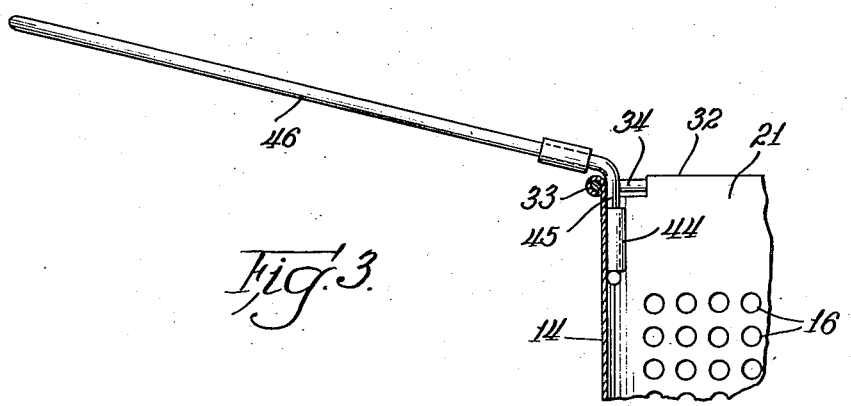
Fig. 3 is a fragmentary sectional view of a portion of the basket with detachable handle element applied thereto.

At 43 the intervening area between the two vertical embossments 36 and 37 is incised to define a pair of vertically rectangular shapes with the outer vertical boundaries thereof integral with the surrounding panel wall and spaced apart a predetermined distance in parallel relationship and the displaced metal is struck inwardly obliquely to the surrounding panel wall and bent over as at 44 to form opposed flange projections at the inner marginal edge portions of said shapes within which may be snugly received the right-angularly bent extremities 45 of a wire looped handle 46 formed as best indicated in Fig. 2.

The hand grip portion of the handle 46 comprises two substantially parallel sections of wire forming a looped continuation as at 47. A sheet metal bridging and stiffening link 48 having rolled and beaded extremities encircling the two parallel sides of handle 46 is capable of being shifted between the dotted and solid outline positions as indicated in Fig. 2. When in the dotted position the extremities of the handle elements 46 are disposed free so as to be flexible toward each other into the dotted outline position designated 49, but when in the solid outline position the same extremities are held rigid so that when disposed inside of the opposed flanges 44 the handle is effectively coupled to the basket and there confined against removal because of its angular conformity which limits movement in one direction and because of the outwardly bent extremities 51 which limits movement in the opposite direction.

While the present invention has been explained and described with reference to a specifically contemplated embodiment it will be understood, nevertheless, that it is capable of modification and variation within its essential scope particularly with shaping the bottom to follow a predetermined contour. Accordingly it is not intended to be limited by the illustrations in the accompanying drawing nor by the words employed in the foregoing description except as indicated in hereinafter appended claims.

What is claimed is:

1. An article of manufacture comprising a die-cut cruciform outlined metallic sheet consisting of a center panel and four foldable extending side wall panels at quadrature, each of said panels having its area substantially perforated, said panels being bent perpendicular to said center panel around a substantial radius of curvature and having their outermost edges rolled into a bead, one of said side wall panels having an intermediate imperforate area flanked by border stiffening embossments, coupling projections struck from said imperforate area, hanger projections struck from said imperforate area adapted to cooperate with a cooking utensil which supports said sheet and side edge flanges formed on each of said side wall panels for overlapping engagement with those of adjacent side walls extending from a level just above the corner curvatures to bead.

2. A fryer basket or similar article which comprises an integral metallic sheet cut-out including a center panel and radially extending side wall panels, said side wall panels being bent into substantial perpendicularity with respect to said center panel and having their outermost edges rolled into bead lip formation, one of said side wall panels having an imperforate area flanked by border stiffening embossments, coupling projections for a carrier handle struck from said imperforate area, and hanger projections for horizontal beaded studs struck from said imperforate area, said integrally formed panels having perforations formed therein adapted to provide free fat circulation through substantially all portions of said basket.

3. A deep frying food receptacle which comprises a unitary sheet metal formation of side wall panels and a bottom wall panel, curved corner portions at each intersection of said bottom wall panel with each of said side wall panels and overlapping seam fringes between each of said side wall panels spot welded to each other, said corner portions being perforated longitudinally thereof and also defining apertures at the edge junctions of adjacent corner portions, whereby to present throughout accessibility to the flow and intermingling of receptacle cooking fluids.

4. A well cavity lining receptacle for containing food for deepfat frying which comprises an integral folded metallic sheet profiled into a bottom wall panel and perimetrically extending front, rear, and side wall panels, said front, rear and side wall panels being bent around substantial radii of curvature into perpendicularity with respect to said bottom wall panel and having side flange portions bent around substantial radii of curvature into overlapping surface engagement with the flange portions of adjacent panels, corner portions at the intersection of the vertical and horizontal curvature corners forming frusto-spherical corners with the perpendicularly bent panel edges butting each other edge to edge at the frusto-spherical regions, said butting edges extending between semi-circular edge perforations in said panels.

5. The construction set forth in claim 4 in which at least one of said perpendicularly bent panels is embossed with accessory coupling protrusions and stiffening embossments pressed into the sheet at the side of said protrusions.

6. The construction called for in claim 4 in which a row of perforations is present in the portions of substantial radii of curvature.

7. A method of constructing deep well fryer baskets comprising the steps of die stamping a cruciform outlined pattern including a center bottom wall panel with flanking fore, rear and side wall panels out of a single sheet of metal stock, incising a pair of substantially arch-shaped brackets in one of said fore and rear wall panels, bending said brackets to dispose a major portion thereof in offset parallel relation to said one of said wall panels, incising one of said fore and rear panel walls to define a pair of vertically rectangular shapes with the outer vertical boundaries thereof integral with the surrounding panel wall and spaced apart a predetermined distance in substantially parallel relationship, striking the rectangular shapes thus defined at right angles away from the surrounding panel wall in the same direction and bending the inner vertical marginal edge portions of said rectangular shapes toward one another to define opposed flange projections, bending all of the flanking panels with respect to the bottom wall panel along merging corner curvatures to form side walls, bending the fringe edges of adjacent side walls into overlapping relationship, and joining overlapping fringe edges of said side wall panels to each other in their bent condition.

8. A method of constructing deep well fryer baskets comprising the steps of die stamping a cruciform outlined pattern including a center bottom walled panel with flanking fore, rear and side wall panels out of a single sheet of metal stock, profile shearing the incorner sections between adjacent flanking panels to define inset corner edges, die punching perforations in the stock including row clusters of perforations along bend lines between said fore, rear and side wall panels and said bottom wall panel, die punching a hemispherical cut-out portion along the bottom corner edges of each of said fore, rear and side wall panels, bending all of the flanking panels with respect to the bottom wall panel to form side walls with said bottom corner edges in abutting engagement to define corner apertures, bending the fringe edges of adjacent side walls into overlapping relationship and joining said walls along overlapping edges thereof.

References Cited in the file of this patent

UNITED STATES PATENTS

| | | |
|---|---|---|
| 672,275 | Leighton | Apr. 16, 1901 |
| 1,005,708 | Hulbert | Oct. 10, 1911 |
| 1,404,154 | Lee | Jan. 17, 1922 |
| 2,570,374 | Pompa | Oct. 9, 1951 |
| 2,593,392 | Budlame et al. | Apr. 15, 1952 |
| 2,597,695 | Braski et al. | May 20, 1952 |